US008620873B2

(12) United States Patent
Liakos et al.

(10) Patent No.: US 8,620,873 B2
(45) Date of Patent: Dec. 31, 2013

(54) METHOD FOR SUPPORTING A SAFETY-ORIENTED SYSTEM

(75) Inventors: Efthimios Liakos, Nürnberg (DE);
Roland Porsch, Speichersdorf (DE);
Stefan Rothbauer, Allershausen (DE);
Martin Rothfelder, München (DE);
Michael Zanzinger, Schwaig (DE);
Hartmut Zeilmann, Neunkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 631 days.

(21) Appl. No.: 12/808,370

(22) PCT Filed: Nov. 12, 2008

(86) PCT No.: PCT/EP2008/065369
§ 371 (c)(1),
(2), (4) Date: Jun. 16, 2010

(87) PCT Pub. No.: WO2009/077271
PCT Pub. Date: Jun. 25, 2009

(65) Prior Publication Data
US 2010/0313075 A1 Dec. 9, 2010

(30) Foreign Application Priority Data

Dec. 18, 2007 (DE) .......................... 10 2007 060 814
Apr. 14, 2008 (DE) .......................... 10 2008 018 680

(51) Int. Cl.
*G06F 17/00* (2006.01)
*G06F 7/00* (2006.01)

(52) U.S. Cl.
USPC ......................................... 707/690; 717/131

(58) Field of Classification Search
USPC ........................................... 717/131; 707/690
See application file for complete search history.

(56) References Cited

U.S. PATENT DOCUMENTS

| 6,470,430 | B1 * | 10/2002 | Fischer et al. ................ 711/153 |
| 8,224,791 | B2 * | 7/2012 | Rieger ........................... 707/690 |
| 8,285,689 | B2 * | 10/2012 | Du et al. ........................ 707/687 |
| 8,291,005 | B2 * | 10/2012 | Lang et al. ..................... 709/201 |
| 2003/0014381 | A1 * | 1/2003 | McMillan et al. ................ 707/1 |
| 2005/0283834 | A1 | 12/2005 | Hall |
| 2006/0206855 | A1 | 9/2006 | Boxall et al. |
| 2007/0168957 | A1 | 7/2007 | Li |

OTHER PUBLICATIONS

Hill M. G. et al., "Non-Interference Analysis for Mixed Critically Code in Avionics Systems", Proceedings ASE 2000, 15th IEEE International Conference on Automated Software Engineering, 2000, pp. 257-260.*

(Continued)

*Primary Examiner* — Pavan Mamillapalli
(74) *Attorney, Agent, or Firm* — Harness, Dickey & Pierce, P.L.C.

(57) ABSTRACT

At least one embodiment of the present invention relates to supporting a safety-oriented system, with the safety-oriented system including safety-critical software components and non-safety-critical software components. In this method, a possibility of a safety-critical software component and a non-safety-critical software component influencing each other is identified and a set of technical measures for preventing the possibility of influencing is defined. In this way, an absence of feedback from non-safety-critical software components to safety-critical software components is both verified and also ensured by at least one embodiment of the present invention.

10 Claims, 3 Drawing Sheets

(56) References Cited

OTHER PUBLICATIONS

Standard IEC 61508;"Functional Safety of electrical /electronic /programmable electronic safety-related systems ," Dec. 1998, 122 pages.

Standard EN 50128; ;"Railway Applications—Communications, Signalling and processing systems—Software for railway control and protection systems" Mar. 2001, 104 pages.

Gong Li et al., "Going Beyond the Sandbox: An Overview of the New Security Architecture in the Java Development Kit 1.2", Proceedings of the Usenix Symposium on Internet Technologies and Systems, XX, XX, Dec. 1, 1997, pp. 1-10; Others.

Hill M. G. et al., "Non-Interference Analsysis for Mixed Critically Code in Avionics Systems", Proceedings ASE 2000, 15th IEEE International Conference on Automated Software Engineering, 2000, pp. 257-260; Others.

Project FP6-015905 Mobius "Mobility, Ubiquity and Security: D1.1 Report on Resource and Information Flow Security Requirements (Submission date: Mar. 27, 2006, Revision 285, Final Public", Internet Citation, 2006, pp. 1-72 http://mobius.inria.fr/twiki/bin/view/DeliverablesList/WebHome; Others.

Internet: http://www.oracle.com/database/berkeley-db/index.html Feb. 2010; Others.

Internet: http://www.sqlite.org Feb. 2010; Book.

* cited by examiner

METHOD FOR SUPPORTING A SAFETY-ORIENTED SYSTEM

PRIORITY STATEMENT

This application is the national phase under 35 U.S.C. §371 of PCT International Application No. PCT/EP2008/065369 which has an International filing date of Nov. 12, 2008, which designates the United States of America, and which claims priority on German patent application numbers DE 10 2007 060 814.6 filed Dec. 18, 2007, and DE 10 2008 018 680.5 filed Apr. 14, 2008, the entire contents of each of which are hereby incorporated herein by reference.

FIELD

At least one embodiment of the present invention generally relates to a method for supporting a safety-oriented system.

BACKGROUND

One of the objectives of a safety-relevant or safety-oriented system is to guarantee a reliable and correct functioning of software components which are involved in safety-critical functions.

When a safety function is executed its reliability and correctness can be influenced by the occurrence of errors. Typically errors such as random hardware faults or systematic design errors can occur in such cases. A possible defect in a processing unit could be cited as an example of a random hardware fault. This produces a malfunction which adversely affects the handling of a device (e.g. of a vehicle) in which the processor unit is employed. Possible design errors can occur even during the development phase because of incorrect implementation of the specification (e.g. modeling or planning). Such errors and similar errors can have serious consequences in safety-relevant systems.

If the transport area (e.g. railways or aircraft) is considered as an example, such errors can typically lead to a system or a device (of a vehicle for example) becoming unmanageable, with the concomitant serious consequences for the passengers. Nor is a permanent adverse effect on the environment beyond the bounds of possibility.

To ensure functional safety at least one safety requirement is generally specified for each specified safety function, in order to achieve and/or to fulfill a predetermined safety level. Functional safety is then seen is being provided if each specified safety function is executed and for each safety function a desired level of fulfillment is achieved in accordance with the corresponding safety integrity level. It should be noted here that the safety integrity level (SIL) is a property of a safety function and does not relate to a system or to a subsystem. This safety function is realized through a combination of systems however, which consist of software and hardware components. The safety integrity system thus relates to an end-to-end safety function of a safety-related system.

Like every other component of the safety-oriented system, a software component does not have any Safety Integrity Level (SIL) if it is considered in isolation from a safety-related system. If the software component is integrated into a system, the software component can be suitable for supporting safety functions for a specific SIL. This depends on how the software component was specified, developed, implemented and/or verified.

The software safety integrity level n or SSIL n is specified as follows: Software which has been developed using appropriate techniques and measures, with the techniques and measures ensuring that the software meets the requirements for systematic failures of a specific safety function X for SSIL n.

Thus a software safety integrity level is not a property of systems, subsystems or components. The above specification can be interpreted such that the software system, software subsystem or the software components can be used at integrity levels up to SSIL 1, 2, 3 or 4. This alone is not sufficient however to establish a safety function for the required SSIL. The software safety integrity level of a subsystem determines the highest SSIL which can be made to apply for a safety function using this subsystem. The enabling or the usability of a subsystem for SSILn (with n=1, 2, 3 or 4) is achieved if the SW subsystem fulfils the requirements of prespecified safety standards (e.g. IEC 61508, EN50128 etc.).

Furthermore product-liability is also an important aspect as far as safety-relevant or safety-oriented systems are concerned. If a (purchased) product is faulty, under some circumstances claims for damages can also be made. The manufacturer can deny responsibility for the damage if the fault was not present when the product was put into circulation or if the product met predetermined safety expectations and predetermined legal requirements.

There is currently no legal standard in the European legal system which imposes mandatory requirements on the electronic systems in relation to checking their fault safety or functional safety. However the fact that the electronics sector is becoming ever larger and safety is consequently becoming ever more important means that an alternative was created which guarantees the mostly demanded safety of products here. It is therefore sufficient for the evidence and accordingly an approval of a failsafe characteristic of electronic systems to be available from the responsible authority, (e.g. test certification authority or railway governing board) and the manufacturer's technical service. An approval is given in such cases based on predetermined rules or standards (e.g. IEC 61508, EN50128 etc.).

Safety-relevant or safety-oriented systems having software components have safety requirements imposed upon them by the predetermined rules or standards which describe how a safe behavior of the system is guaranteed and how the occurrence of danger situations can be prevented.

The safety relevance of technical systems is derived from the maximum safety requirement on the functions made available by these systems. If one considers the use of software in safety-oriented systems, then as a rule only a small part of safety functions are taken over by the software. I.e. the software components used are to be subdivided into safety-relevant or safety-critical software components on the one hand and non-safety-relevant or non-safety-critical software components on the other hand. Since there is the possibility that the non-safety-critical software components can impinge on the safety of the safety-critical software components, i.e. they can mutually influence each other, these are developed to be just as safe as the safety-critical software components.

In this case the embodiment of a non-safety-critical software component or software function may not negatively influence the reliable or correct execution of a safety-critical software component or software function. This influencing occurs as so-called feedback. This feedback can be suppressed by an explicit separation between the function classes (safety-critical, or non-safety critical) on a system. This separation is to be understood as absence of a feedback from non-safety-critical software components or functions to safety-critical software components or functions.

The implementation of the non-safety-critical software components or functions with the same level of safety as the safety-critical software components or functions leads however to restrictions in the non-safety-critical software components (e.g. in respect of their functionality or coding guidelines) and to great expense in relation to the development of the non-safety-critical software components to be used.

Further known procedures again follow the path of separating the safety-critical and non-safety-critical software components by setting up hardware components which have either safety-critical of non-safety-critical software components. In this way a physical separation of the components is achieved. Since these components interact however, the appropriate safe interfaces must be set up. Both the design of the hardware components and also the design of the respective interfaces result in a higher outlay.

The above-mentioned known way of using software components in safety-oriented systems results in the implemented software being bound into the respective area of application. If one wishes to use implemented software in another way in order to save development costs it is generally only possible with a major effort in conversion, in which case the safety questions have to be asked and checked once more.

SUMMARY

At least one embodiment of the invention provides for an improved support for a safety-oriented system having safety-critical software components and non safety-critical software components. In such cases supporting the safety-oriented system especially includes verifying and/or ensuring absence of feedback. I.e. the suppression of a mutual influencing of a safety-critical software component and a non-safety-critical software component and evidence of the fact that such mutual influencing is excluded or is at least excluded up to the specified possible maximum.

In at least one embodiment, a method is disclosed for supporting a safety-oriented system, with the safety-oriented system having safety-critical software components and non-safety-critical software components and with the method comprising:

Identifying a possibility of mutual influencing of a safety-critical software component and a non-safety-critical software component and
Defining a set of technical measures for preventing the possibility of influencing.

In at least one embodiment, the present invention makes it possible to use formal methods and techniques in software and system development, with the correctness of a software design, an analysis or design model being able to be shown in relation to functional safety requirements. The method also makes it possible to impose the highest safety demands on a safety-relevant or safety-oriented system and to guarantee said demands.

In accordance with at least one embodiment of the present invention, within the context of identifying the possibility of mutual influencing of a safety-critical software component and a non-safety-critical software component and/or the definition of a set of technical measures to prevent the possibility of influencing can be implemented using formal methods and techniques.

In accordance with an example embodiment of the present invention, the identification features determination of a subset of technical system resources of an area of activity of the safety-critical software component and of an area of activity of the non-safety-critical software component. In this way a general and thereby reusable identification of the possibilities of mutual influencing or ensuring absence of feedback is permitted which can the at same time also be employed explicitly.

In accordance with an example embodiment of the present invention the identification features evaluation of at least one technical system resource from the subset of technical system resources in respect of the possibility of mutual influencing. This enables one possible resource of the technical system resources determined, e.g. main memory, file system, software resource, indication mechanism or communication means) to be investigated more precisely and to be marked accordingly in respect of their safety system relevance.

In accordance with an embodiment of the present invention, the definition of the set of technical measures can be undertaken by analyzing the possibility of mutual influencing.

In this case the definition of a set of technical measures can be undertaken based on the evaluation of the at least one technical system resource.

The definition of the set of technical measures can feature different types of technical measure in accordance with at least one embodiment of the present invention, which makes a flexible implementation of at least one embodiment of the present invention possible. In such cases a mixed form or a combination of the different types of technical measure is also possible.

In accordance with an example embodiment of the present invention the definition of a set of technical measures can feature specification of a configuration measure.

Furthermore the definition of the set of technical measures can feature an analysis using software techniques of the safety-critical software components in respect of the possibility of mutual influencing.

Furthermore the definition of the set of technical measures can feature specification of an application for preventing the possibility of mutual influencing.

In addition at least one non-safety critical software component of the set of non-safety-critical software components of the safety-oriented system can be an open source software component. I.e. an open source software component can be used as the non-safety-critical software components for which the possibility of mutual influencing is identified and in respect of which a set of technical measures is defined.

The use of public domain or open source software in safety-oriented systems has been avoided thus far since the public domain or open source software has not been able to be verified as being suitable for the safety-oriented applications.

For economic reasons companies are often forced nowadays not to develop software components in a system themselves but to opt to reuse existing components. Often the software pool of a company does not contain sufficient software parts to meet all requirements for specific software components in the respective projects oriented towards safety-oriented systems.

In such cases software components which are bought in (so-called COTS, commercial off-the-shelf) products or can be obtained from the inexhaustible pool of open source software provide a remedy. When COTS (commercial off-the-shelf) or open source software is used in safety systems however, the requirements of the safety standards must be met. As already mentioned this has not been the case previously.

At least one embodiment of the present invention offers a formal method of operation for verifying and ensuring predetermined safety-relevant standards. In such cases evidence of the absence of feedback is provided for when the respective (non-safety-critical) components are used in a corresponding project. In particular the evidence is guaranteed for non-safety-critical software components which can include COTS or open source software components. In such cases the evidence of the absence of feedback is produced in accordance with the existing safety standards using formal methods and techniques. In accordance with the present invention, constructive, analytical and/or applicative measures make it possible to prevent threats which, when they occur, have a negative influence on the execution of the safety-critical functions in the system.

At least one embodiment is directed to a device which is designed to support a safety-oriented system, with the safety-oriented system having safety-critical software components and non-safety-critical software components and with the device been configured:

To identify a possibility of a safety-critical software component and a non-safety-critical software component influencing each other; and To define a set of technical measures for preventing the possibility of the components influencing each other.

Overall the device is configured to execute the steps of the method outlined above and is explained below in greater detail.

At least one embodiment is directed to a system which is designed to execute steps of the method outlined above and explained in greater detail below.

Furthermore, at least one embodiment is carried out by a computer program with the computer program having coding which is configured to execute the steps of at least one embodiment of the method outlined above and explained in greater detail below. In this case the computer program can be stored on a data carrier.

In addition the above-mentioned task is achieved by a data carrier having the computer program mentioned here.

In addition the above-mentioned task is achieved by way of a safety-oriented system having safety-critical software components and non-safety-critical software components and which is configured to ensure an absence of feedback to the safety-critical components by executing the steps of the method outlined above and explained below in greater detail. As already explained at least one open source software component or COTS can be embodied in this case as at least one non-safety-critical software component.

BRIEF DESCRIPTION OF THE DRAWINGS

The invention is explained below in greater detail with reference to the schematic drawing in which.

DETAILED DESCRIPTION OF THE EXAMPLE EMBODIMENTS

Figure 1:
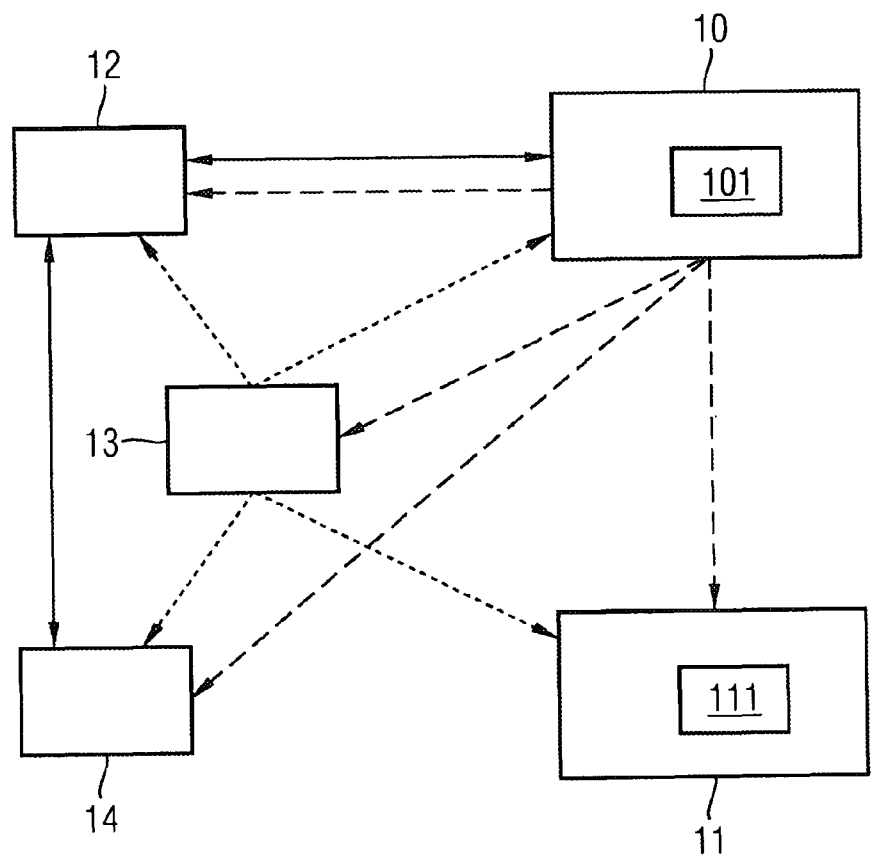
FIG. 1 shows possible interactions between software components of a safety-oriented system in accordance with an example embodiment of the present invention.

FIG. 1 shows possible interactions between software components of a safety-oriented system in accordance with an example embodiment of the present invention.

Described below is the verification and the ensuring of absence of feedback when an open source software component is used, namely the SQLite embedded database as a message archive, standard EN50128 with formal methods and techniques in accordance with an example embodiment of the present invention. In this case the message archive is involved in the execution of non-safety-critical functions. These can threaten to create feedback to the correct and reliable execution of safety-critical functions in the safety-oriented system. Constructive, analytical and applicative measures prevent these threats (which have arisen through the mutual influencing of the safety-critical and non-safety-critical software components) negatively influencing the execution of the safety-critical functions in the system.

It goes without saying that the above-mentioned open source software components as non-safety-critical software components and the above-mentioned standard EN50128 merely serve to represent one concrete example. Embodiments of the present invention is not restricted in respect of the software components used and in respect of the safety standards to be adhered to. Likewise embodiments of the present invention is not restricted to any area of application and is able to be used and implemented in the various possible safety-oriented systems.

In accordance with the present example embodiment the software components 101, 111, 12, 13 and 14 are divided up into three function classes.

Software component involved in the execution of safety-critical functions (SSIL>0);

Software component performs tasks such as monitoring safety-critical functions (SSIL>0); and Software component is involved in the execution of non-safety-critical functions (SSIL=0).

With safety-critical (safety-relevant) software components 12, 13 a safety-critical or safety-relevant function is generally implemented technically using software by collaboration, i.e. by software components working together in a system. This occurs regardless of whether the safety function is executing in continuous mode or in on-demand mode. The collaborating components thus belong to the safety group from which the software safety integrity level (SSIL) results. All software components 12, 14 which are involved in the execution of a safety-critical functionality belong to the function class of safety-critical software components with a corresponding SSIL.

Monitoring software components 13 represent self-test and monitoring/diagnostic software components. These have the task of checking system resources for random hardware faults. Such software components can typically be a monitor adapter in collaboration with an SEP (Safety Environment Processor) on a system server for example. In this case the SEP would be the safety-critical software component and the monitor adapter would be the non-safety-critical software component. All software components 13 which are involved in monitoring and diagnosis of hardware belong to the function class of monitoring software components. These components too may not be influenced by other software components.

Those software components which are involved in non-safety-critical functionalities are regarded as non-safety-critical software components 101, 111. These software components belong to SSIL 0 so to speak. The message archive belongs to this class in accordance with the present example embodiment.

The relationships between the software components 101, 111, 12, 13, 14 are shown by arrows in FIG. 1. In this diagram the dotted-line arrows originating from the monitoring software components 13 point to the software components 12, 14, 101, 111 which are monitored by the monitoring software component 13. The solid arrows indicate that collaboration is taking place between the respective software components 12 and 101, 12 and 14. The dashed-line arrows leading from the non-safety-critical software component 101 to the software components 12, 13, 14 and 111, indicate those components on which the non-safety critical software component 101 (here typically an SQLite Embedded Database as a message archive) has a feedback effect. I.e. the non-safety-critical software component 101 and the safety-critical software components 12, 13 and 14 mutually influence each other. In this case a mutual influencing in accordance with the present invention includes both influencing in both directions (influencing of a non-safety-critical software component 101 by a safety-critical software component 12, 13 and 14 and influencing of a safety-critical software component 12, 13 and 14 by a non-safety-critical software component 101) and also influencing in only one direction, (i.e. influencing of a non-safety-critical software component 101 by a safety-critical software component 12, 13 and 14 or influencing of a safety-critical software component 12, 13 and 14 by a non-safety-critical software component 101).

It should also be noted that in FIG. 1 the non-safety-critical components 101 and 111 each have an interface 10, 11 in order to interact, to communicate and/or to collaborate with the safety-critical software components 12, 13, 14. These interfaces 10, 11 are however not absolutely necessary, the present invention can be implemented and executed even without using such interfaces 10, 11.

Each software component 101, 111, 12, 13, 14 has an effective area in a system. An effective area is an area of the safety-oriented system in which all within the framework of which the respective software component 101, 111, 12, 13, 14 is effective, i.e. works, communicates, interacts and/or collaborates or acts with other components of the system. Since a safety-related or safety-oriented system consists of a number of software components 101, 111, 12, 13, 14, each with its own effective area, there is a potential danger of these components influencing each other during the execution of a function. In such cases the influencing occurs via the interfaces of the effective areas of the software components 101, 111, 12, 13, 14. This means that there is the danger of feedback in the execution of a function to the execution behavior of a safety function so that the correctness and reliability of this safety group can no longer be guaranteed in accordance with the associated safety integrity level.

To counter this all possible feedback from a non-safety-relevant component to a safety-relevant or safety-critical software component is investigated. In such cases the assessment is undertaken via the interfaces of the non-safety-critical software components. The term interface as a technical software term must be expanded here within the feedback context. Not only is the direct communication or collaboration or software components working together understood as an interface but the common subset of all mutual influences which can occur across the effective areas of the software components 101, 111, 12, 13, 14. The focus of safety-related system in accordance with the present example embodiment is the explicit influencing of a safety-critical software components 12, 13, 14 by a non-safety-critical software component 101, 111 via the common interface.

In a software system these interfaces form the jointly-used resources of the operating system or of the framework lying above it which provide the execution framework of the SW components. In these cases feedback between the software components 101, 111, 12, 13, 14 typically occurs via the main memory, the file system, kernel resources or via the communication mechanisms within a processor or even across processors.

Figure 2:
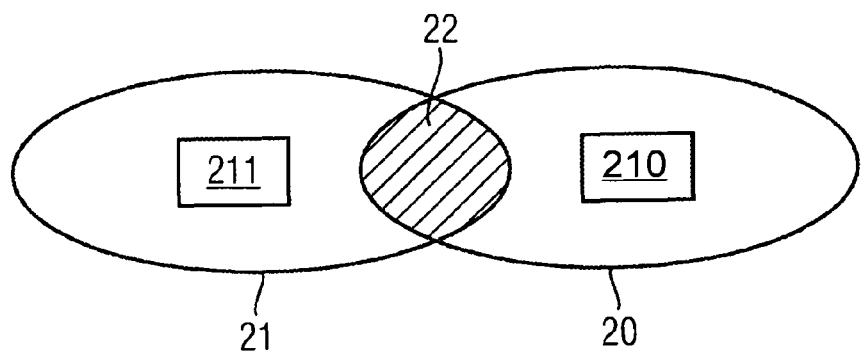
FIG. 2 shows an interface of a safety-critical software component and a non-safety-critical software component in accordance with an example embodiment of the present invention.

FIG. 2 shows an example of an interface 22 (i.e. a subset of technical system resources) of the effective areas 21 and 20 of a safety-critical software component 211 and a non-safety-critical software component 210 (e.g. an SQLite Embedded database as message archive).

In accordance with the example embodiment of the present invention a type of barrier is constructed in order to suppress certain influences between safety-critical and non-safety-critical software components of the safety oriented system or to avoid them and thereby to prevent any feedback. The so-called barrier or shell is designed to capture and if necessary to remove the various threats which arise from the respective software components. This enables the necessary measures to be taken by the safety-oriented system in order to capture the feedback. Thus on occurrence of a disruptive event which might typically cause no more main memory to be available, the execution of a non-safety-critical function affected by this event can be ended by the system (operating system or framework). On occurrence of any other event through which for example no secondary memory is available, in accordance with the present invention the events can be captured or identified and the execution process of the message archive can be ended in order to guarantee the operational integrity of the safety-oriented system.

Figure 3:
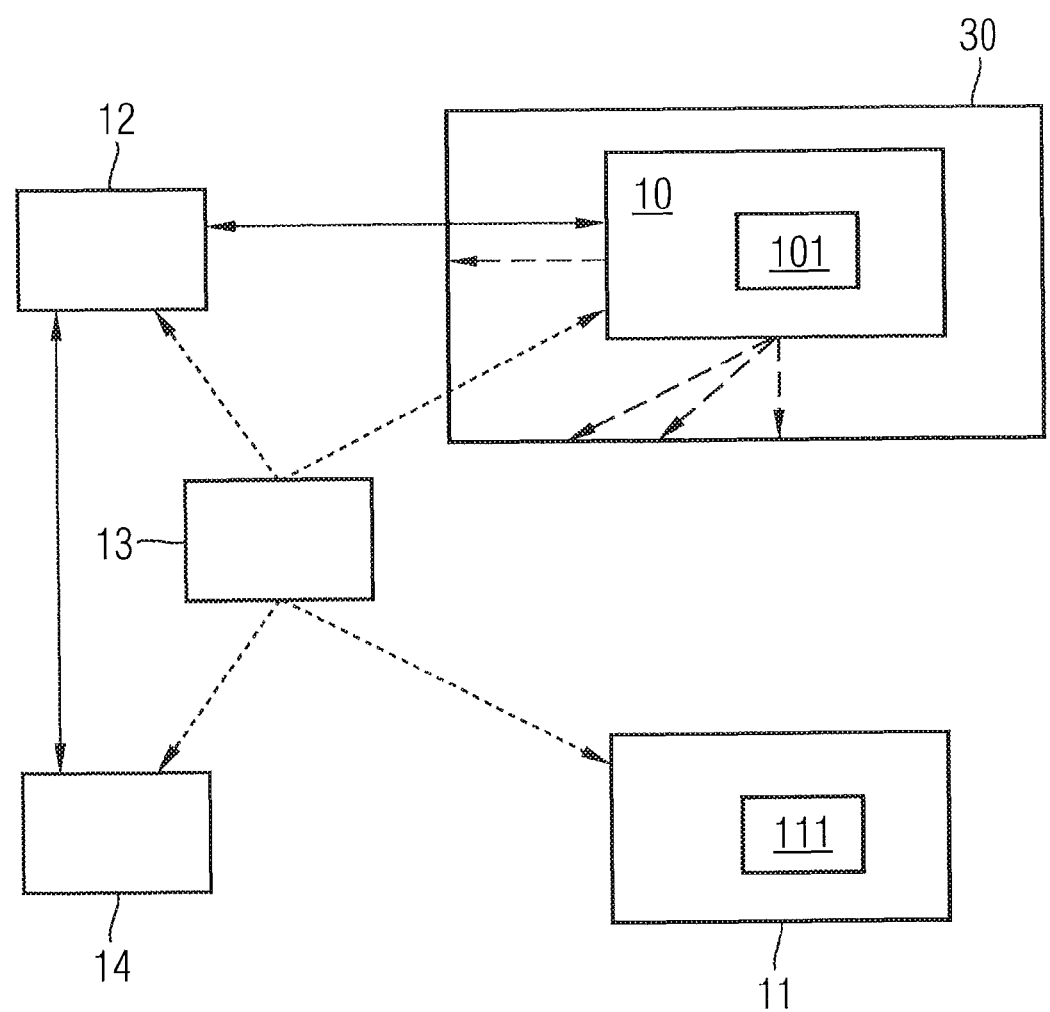
FIG. 3 shows a feedback barrier implemented or embodied in accordance with an example embodiment of the present invention.

FIG. 3 shows a feedback barrier implemented or designed in accordance with the exemplary embodiment of the present invention.

The components of FIG. 3 correspond to the components of FIG. 1. The monitoring and collaboration relationships which are shown as dotted-line or solid arrows are also provided or embodied between the software component as in the original diagram. The inventively used feedback barrier or shell 30 has the effect of capturing the feedback from the non-safety-critical software components 101 to the safety-critical software components 12, 13 and 14, i.e. of ensuring absence of feedback. The capturing of the feedback is represented by the restriction of the feedback relationships which are shown as dashed-line arrows, by the feedback barrier 30. I.e. the non-safety-critical software component 101 is isolated by establishing a runtime shell as a feedback barrier 30.

This is done by defining, determining and/or detecting measures for avoiding feedback between software components in a safety-oriented software system. The measures in this case can be divided into constructive, applicative and analytical measures.

Constructive measures are a type of preventive measures which can already be taken into consideration during configuration so that no feedback to other software components 12, 13, 14, 111 can arise from a non-safety-critical software component 101 in a safety-oriented system. In this case is tried and tested operating system mechanisms for establishing a separate runtime shell of the non-safety-critical software component can be used. Accordingly a runtime shell 30 can be configured or implemented for example by appropriate definition or embodying of user rights, file system, partitions etc.

Analytical or verification measures have the objective of testing, evaluating and (external) verification of the absence of feedback of the items under test. This can for example be undertaken by an explicit checking of the software code, with a series of software test tools and methods able to be used for this purpose.

Applicative measures implement prevention of the feedback to other software components in the system using programming steps (e.g. by operating system API calls to restrict the main memory). In such cases standardized software tools oriented to the respective problem can be used which are constructed for example based on the experience of experts.

As already explained, in accordance with present example embodiment an SQLite embedded database in the form of a message archive is used as the non-safety-critical software component. Explained below are examples of identified possibilities or interfaces (i.e. subset of technical system resources) of a mutual influencing of a safety-critical software component and the SQLite embedded database in the form of a message archive. In respect of a technical system resource a set of technical measures for preventing the possibility of influencing and thereby of feedback is defined.

During an analysis or during an identification of the possibilities of mutual influencing the following definitions or results are achieved:

Archive is used by a potentially safety-critical processes (e.g. system map);

Archive does not in itself have any safety-critical function;

Absence of feedback of the archive component on the other processes must be ensured.

In such cases mutual influencing or feedback is possible via or through the following technical system resources: Main memory, flash memory, CPU loading, global resources (futex, file locks, file handles, tasks), communication (TCP/IP).

If one now considers the possibility of influencing or feedback by the technical system resource main memory, an evaluation in respect of the main memory reveals that a possible threat for the safety-oriented system can lie in a disproportionate use of the main memory by the SQLite database as archive 101, so that other processes or software components 12, 13, 14, 111 can be hindered. Archive is used by potentially safety-critical processes (e.g. system map) and does not in itself have any safety-critical function. To ensure the absence of feedback of the component archive 101 to the other processes, a constructive measure such as setting a defined hard system limit for the use of main memory can be defined for example.

Furthermore an evaluation in respect of the main memory can reveal that a possible threat for the safety-oriented system can occur in the overwriting of files by other processes or software components 12, 13, 14, 111. Here a constructive measure such as the realization of the SQLite database can be defined as an autonomous container in the system framework. The SQLite database as archive thus becomes a separate operating system process. This means that the influencing of other processes or software components 12, 13, 14, 111 by the SQLite database via the main memory is not possible.

If one now considers the possibility of influencing or feedback by the technical system resource flash memory, an evaluation in respect of the flash memory reveals that a possible threat for the safety-oriented system can lie in a disproportionate use of the flash memory by the SQLite database as archive 101, so that other processes or software components 12, 13, 14, 111 can be hindered. To ensure the absence of feedback of the component SQLite database archive 101 on the other processes or software components, a constructive measure can be undertaken such as storing the SQLite database files on a separate partition in the file system; a growth of the SQLite database files beyond this size is thus suppressed by the operating system.

Furthermore an evaluation in respect of the main memory can reveal that a possible threat for the safety-oriented system can occur in accidental writing into another partition. Here for example a constructive measure such as starting the SQLite database as an archive process with a restricted user rights can be defined. This means that no write accesses to other partitions of other processes or software components 12, 13, 14, 111 are allowed.

If one now considers the possibility of influencing or feedback by the technical system resource CPU loading, an evaluation in respect of the CPU loading reveals that a possible threat for the safety-oriented system can lie in a disproportionate use of computing time by the SQLite database as archive 101, so that other processes or software components 12, 13, 14, 111 are hindered. Here the following application measures can be defined for example:

Monitoring of all processes or software components running by means of a heartbeat protocol. If a running process or a running software component is not present, the component involved is restarted;

Monitoring of the system and also of the remaining processes or software components by an SEP framework, if there are problems there is a controlled or if necessary also a hard shutdown.

If one now considers the possibility of influencing or feedback by the global resources (e.g. futex, file locks, file handles or tasks), an evaluation in respect of the global resources reveals that a possible threat for the safety-oriented system can lie in a disproportionate use of global resources by the SQLite database as archive 101, so that other processes or software components 12, 13, 14, 111 are hindered. In this case the following analytical measures can be defined:

The generated library of SQLite 101 can be investigated in relation to dependencies to other libraries. This enables dependencies to be covered and prevented by the application if necessary.

System functions can be called or investigated. In such cases the use of futex, file locks, file handles and/or tasks can be investigated. Possible faults can be rectified by the application.

If one now considers the possibility of influencing or feedback by (e.g. TCP/IP), an evaluation in respect of communication reveals that a possible threat for the safety-oriented system can occur in an undesired link to other processes or system components 12, 13, 14, 111 by the SQLite database as archive 101. In this case the following analytical measure can be defined: Calls (e.g. bind, socket, listen or accept under Linux), which result in a communication should be prevented or avoided as far as possible (e.g. provided other communication paths are provided). This can be implemented accordingly by an application.

Figure 4:
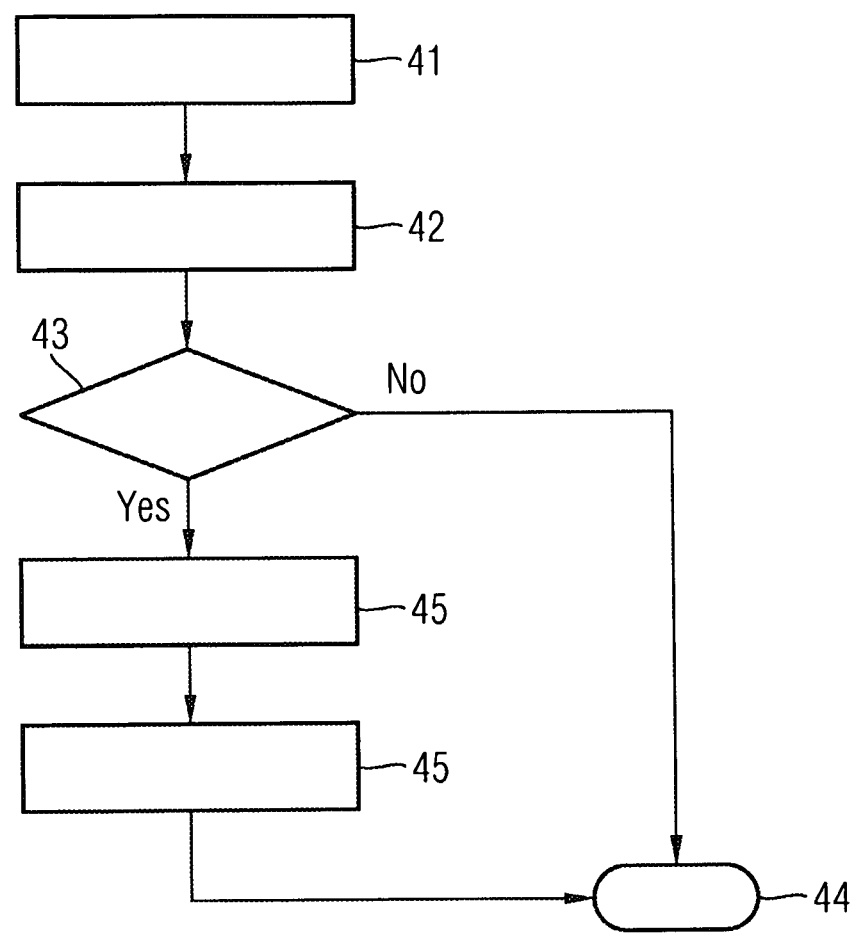
FIG. 4 shows a block diagram of an analysis of a source code as an applicative measure in accordance with an example embodiment of the present invention.

The corresponding source code, such as shown in FIG. 4 for example, can be analyzed for this purpose. In step 41 a configuration and compilation of the non-safety-critical software components (here the SQLite database as archive) with predetermined switches can be carried out. Subsequently in step 42 and analysis of the external symbol dependencies of the program of the non-safety-critical software components and thus of the SQLite database as archive is undertaken. Then an interrogation 43 is performed in which it is established whether external symbol dependencies are present. If no external symbol dependencies are present (indicated by "N"), the analysis of the corresponding source code is ended 44, i.e. there is no threat in respect of an overlap in the communication between the SQLite database as archive and further software components or processes. Otherwise, if external symbol dependencies are present (indicated by "Y") an assignment 45 of external services of the non-safety-critical software components and thus of the SQLite database as archive and determination of software components or processes (e.g. kernel resources) which are influenced by the non-safety-critical software components and thereby the SQLite database as archive is carried out. Subsequently an analysis 46 of the use of remaining resources by the non-safety-critical software components and thereby the SQLite database as archive is undertaken and the program is ended 44.

The requirements from a predetermined safety standard (here EN50128 for example) must be taken into consideration in the development of non-safety-critical components (here typically the archive component in the form of the SQLite database).

In accordance with the present example embodiment SQLite was evaluated as persistence medium under different alternative solutions in accordance with specific selection criteria and selected as the best solution. More details can be found in the decision table below in which possible risks, i.e. feedback or influencing possibilities and the measures defined for these are listed.

As already mentioned, the feedback to other software components or systems can take place in accordance with the present exemplary embodiment through the use of shared resources between the further software components and the archive component as SQLite database. The shared resources in this case can be:
1. Memory;
   a. Main memory;
   b. File system;
2. CPU time/loading;
3. Kernel resources (e.g. mutex, threads, etc.); and/or
4. Communication with other SW components.

In accordance with the present example embodiment it is assumed that the safety of the shared resources is likewise ensured by corresponding monitoring mechanisms, i.e. that weak points (feedback) to the safety-oriented system is recognized for the shared resources and that there is an appropriate reaction to this if necessary.

| Possible risk | Measure |
|---|---|
| Re. 1.a Main memory | |
| The archive component may not influence the memory area of the other software components (e.g. by accidentally overwriting memory etc.) | The archive component is allowed to run as a service in a separate service container since a service container runs in a separate Linux or Windows process and thereby the memory protection mechanisms of the respective operating system operate. |
| The archive component may not claim too much main memory, so that for the safety-oriented system or for the other software components on the server of the system there is not enough main memory available and thus a secure functioning of the safety-oriented system is adversely affected. | Restrict the available main memory for the archive component via the operating system. In Linux for example with the aid of the API function setrlimit ( ). |
| Re 1.b. File system | |
| There is the danger of the archive component occupying too much memory of the safety-oriented system so that the other software components and the safety-oriented system itself no longer have sufficient memory available on the file system. | Define a separate partition for the SQLite database as archive. |
| Possible risk | Measure |
| There is the danger of the SQLite database as archive attempting to access a partition not assigned to it (e.g. by reading and/or writing). | Define separate user rights. It must be clarified here with the safety-oriented system whether it is possible to define different users (rights) for different service containers of the safety-oriented system. Alternately the same group rights can be given to all service containers of the safety-oriented system on system start and rights can then be withdrawn from the service container in which the archive component is running. In such cases a check can be made as to whether in the case of a Linux system this is also possible process-specifically. |
| Re. 2. CPU time/loading | |
| There is the danger of the archive component or the SQLite database claiming too much processor time so that the other software components, especially the safety-critical software components, cannot use processor time or at least cannot use sufficient processor time. | In accordance with the present exemplary embodiment the safety-oriented system will be monitored by an LSM (Linux Safety Manager). If the LSM cannot undertake its monitoring function or task, the SEP (Safety Execution Processor) takes over this task. The safety-critical components are monitored within the safety-oriented system by a heartbeat functionality. All LCM subcomponents of the archive component must implement this functionality for this. These monitoring functionalities can subsequently be verified in a test. |
| Re. 3. Kernel resources | |
| There is the danger of the SQLite database using unrestricted kernel resources. Examples of such resources are typically mutex(es) or file handles. With file handle there can be a number of "File Open" without the corresponding number of "File Close" for the SQLite database. This means that the file handler in the kernel runs "full" so that other software components cannot perform any file operations. | An analysis of the software code is sensible here. In this case it is established which, how many and how the kernel resources are being used by the SQLite database. In such cases the kernel resources used by SQLite are covered. If necessary the application ensures that these run without feedback. |
| Re. 4. Communication | |
| There is the danger here of the SQLite database establishing an undesired communication to other SW components. | A "grep" command can be executed on the source code of SQLite here for example in order to search for such keywords as bind, socket etc. In such cases it can be ensured that the SQLite database is not establishing any communication to other software components. |

Listed below are examples of a number of possible kernel resources of the LINUX operating system used in accordance with the present exemplary embodiment which can be used by the SQLite database:

```
#if OS_UNIX
#define sqlite3OsOpenReadWrite      sqlite3UnixOpenReadWrite
#define sqlite3OsOpenExclusive      sqlite3UnixOpenExclusive
#define sqlite3OsOpenReadOnly       sqlite3UnixOpenReadOnly
#define sqlite3OsDelete             sqlite3UnixDelete
#define sqlite3OsFileExists         sqlite3UnixFileExists
#define sqlite3OsFullPathname       sqlite3UnixFullPathname
#define sqlite3OsIsDirWritable      sqlite3UnixIsDirWritable
#define sqlite3OsSyncDirectory      sqlite3UnixSyncDirectory
#define sqlite3OsTempFileName       sqlite3UnixTempFileName
#define sqlite3OsRandomSeed         sqlite3UnixRandomSeed
#define sqlite3OsSleep              sqlite3UnixSleep
#define sqlite3OsCurrentTime        sqlite3UnixCurrentTime
#define sqlite3OsEnterMutex         sqlite3UnixEnterMutex
#define sqlite3OsLeaveMutex         sqlite3UnixLeaveMutex
#define sqlite3OsInMutex            sqlite3UnixInMutex
#define sqlite3OsThreadSpecificData sqlite3UnixThread-
                                    SpecificData
#define sqlite3OsMalloc             sqlite3GenericMalloc
#define sqlite3OsRealloc            sqlite3GenericRealloc
#define sqlite3OsFree               sqlite3GenericFree
#define sqlite3OsAllocationSize     sqlite3Generic-
                                    AllocationSize
#define sqlite3OsDlopen             sqlite3UnixDlopen
#define sqlite3OsDlsym              sqlite3UnixDlsym
#define sqlite3OsDlclose            sqlite3UnixDlclose
#endif
```

An embodiment of the present invention thus relates to support for a safety-oriented system, with the safety-oriented system having safety-critical software components and non-safety-critical software components. An embodiment of the invention identifies the possibility of mutual influencing of a safety-critical software component and a non-safety-critical software component and defines a set of technical measures to prevent the possibility of components influencing each other. In this way, an embodiment of the present invention both verifies and also ensures the absence of feedback from non-safety-critical software components to safety-critical software components. This is especially the case when a freely-available software component, e.g. an open source software component, is used as a non-safety-critical component.

Although the present invention is explained here with reference to the embodiment in accordance with the enclosed drawings, it is evident that the invention is not restricted to these but can be modified within the area of the inventive idea disclosed above and in the dependent claims. It goes without saying that there can be further embodiments which represent the basic principle of the invention and are equivalent, and that thus various modifications can be implemented without departing from the scope of the invention.

The invention claimed is:

1. A method for supporting a safety-oriented system, the safety-oriented system including safety-critical software components and non-safety-critical software components, the method comprising:
    monitoring the safety-critical software components and non-safety-critical software components via at least one of the safety-critical software components;
    identifying a possibility of mutual influencing of a safety-critical software component being used in collaboration with a non-safety-critical software component;
    defining a set of technical measures for preventing the identified possibility of mutual influencing, the identifying and the defining being undertaken by a device designed for supporting the safety-oriented system, the defining of the set of technical measures including at least one of:
        determining a configuration measure in the safety-oriented system for preventing the identified possibility of mutual influencing;
        analyzing using software techniques of the safety-critical software components in respect of the identified possibility of mutual influencing; and
        determining an application for preventing the identified possibility of mutual influencing; and
    implementing a barrier to a negative influence from at least one of the nonsafety-critical software components to at least one of safety-critical software components resulting from an identified mutual influence while maintaining the collaborative use of the non-safety-critical software components by safety-critical software components.

2. The method as claimed in claim 1, wherein the identifying includes:
    establishing a subset of technical system resources of an effective area of the safety-critical software components and an effective area of the non-safety-critical software components.

3. The method as claimed in claim 2, wherein the identifying includes:
    evaluating at least one technical system resources from the subset of technical system resources in respect of the identified possibility of mutual influencing.

4. The method as claimed in claim 3, wherein the defining of the set of technical measures is carried out based on the evaluation of the least one technical system resource.

5. The method as claimed in claim 1, wherein the defining of the set of technical measures is undertaken by analyzing the identified possibility of mutual influencing.

6. The method as claimed in claim 1, wherein an open source software component is used as the non-safety-critical software component.

7. A computer implemented system including a memory and a central processing unit (CPU), the system being designed to execute the method as claimed in claim 1.

8. A computer implemented safety-oriented system, the system including a memory and a central processing unit (CPU), safety-critical software components and non-safety-critical software components, the system being configured so as to ensure an absence of feedback to the safety-critical software components by executing the method as claimed in claim 1.

9. A non-transitory computer readable medium including program segments for, when executed on a computer device, causing the computer device to implement the method of claim 1.

10. A computer processor, designed for supporting a safety-oriented system, the safety-oriented system including safety-critical software components and non-safety-critical software components, the processor being configured so as to at least:
    monitor the safety-critical software components and non-safety-critical software components via at least one of the safety-critical software components;
    identify a possibility of mutual influencing between a safety-critical software component being used in collaboration with a non-safety-critical software component;

define a set of technical measures for preventing the identified possibility of mutual influencing, the device being configured, when defining the set of technical measures, to carry out at least one of:
- determining a configuration measure in the safety-oriented system for preventing the identified possibility of mutual influencing;
- software analyzing the safety-critical software components in respect of the identified possibility of mutual influencing; and
- determining an application for preventing the identified possibility of mutual influencing; and implement a barrier to a negative influence from at least one of the non-safety-critical software components to at least one of safety-critical software components resulting from an identified mutual influence while maintaining the collaborative use of the non-safety-critical software components by safety-critical software components.

\* \* \* \* \*